Sept. 11, 1928.  J. HOPKINSON  1,684,223
MEAT CLAMP
Filed May 11, 1926
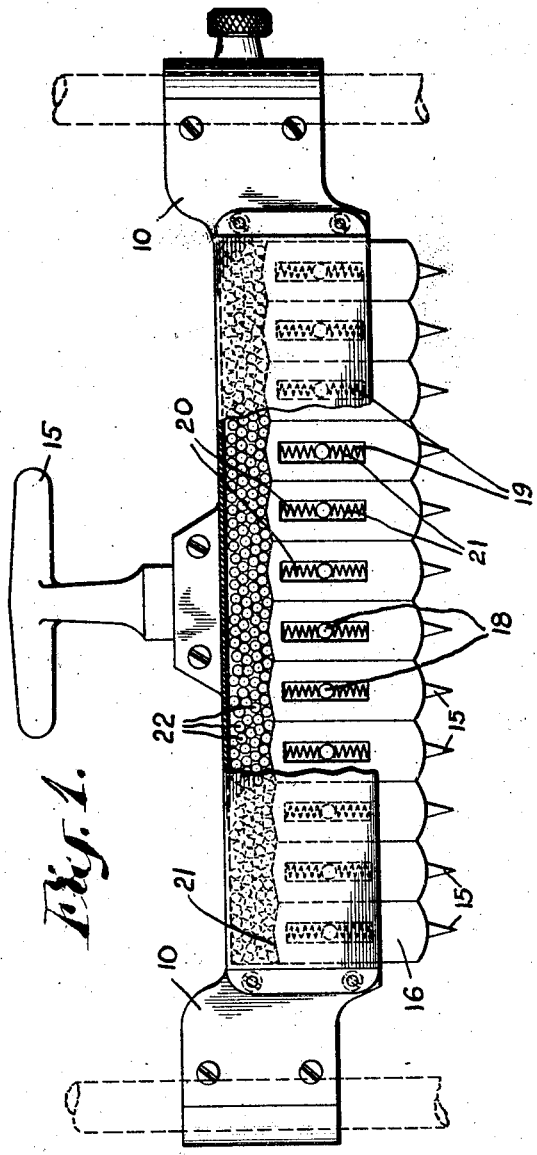
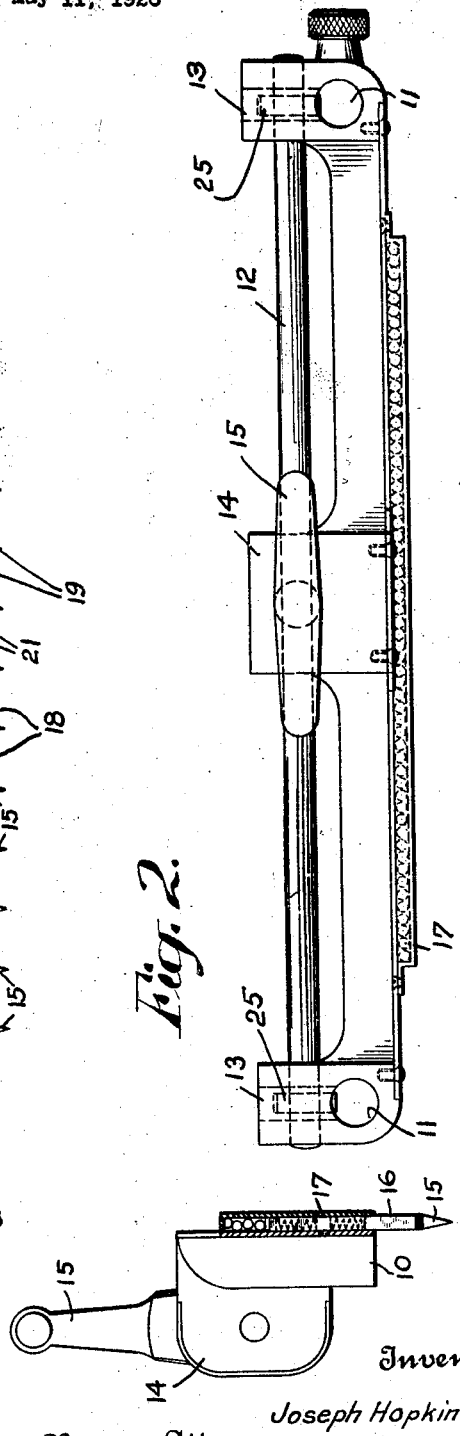
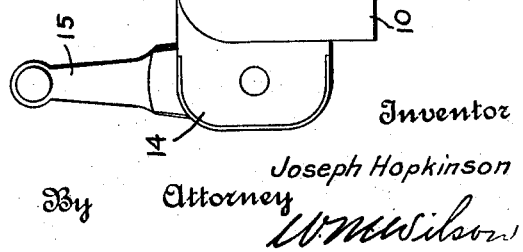
Inventor
Joseph Hopkinson
By Attorney
WMWilson Patented Sept. 11, 1928.

1,684,223

UNITED STATES PATENT OFFICE.

JOSEPH HOPKINSON, OF DAYTON, OHIO, ASSIGNOR TO DAYTON SCALE COMPANY, OF DAYTON, OHIO, A CORPORATION OF NEW JERSEY.

MEAT CLAMP.

Application filed May 11, 1926. Serial No. 108,330.

This invention concerns a clamping bar of improved characteristics for slicing machines and has for its principal object to provide such a clamping bar adapted to automatically conform to the contour of the material being clamped.

A further object of the invention is to provide a clamping bar of this nature with a plurality of resiliently supported clamping elements.

Another object of the invention is to provide a clamping bar having a plurality of displaceable clamping elements and in which displacement of one clamping element will cause displacement of other elements in the opposite direction to permit the clamping elements to quickly and accurately conform to the contour of the material being clamped.

Another object of the invention is to provide a clamping element having a plurality of resiliently mounted clamping tines or prongs in which the tines are displaceable to a limited extent in the direction of clamping and in which displacement of one prong causes displacement of adjacent prongs in the opposite direction to permit all the prongs of the bar to quickly and accurately conform to the contour of the material being clamped.

The clamping bar forming the subject matter of the present invention is particularly adapted to meat slicing machines of the type shown in the patent to Wood 1,558,325, October 20, 1925, and will be described in connection with a meat slicer as therein disclosed. Heretofore the removable clamping element of such machines has usually consisted of a straight bar with tines or prongs rigidly attached thereto which may be lowered into contact with the meat being sliced to hold it firmly against the movable carriage of the machine. This construction serves very well if the meat being sliced has a smooth horizontal upper surface but if this surface is irregular in form, either some of the prongs do not engage the meat at all or the higher portions of the meat are damaged by forcing the clamping prongs too far into them. Clamping elements for these machines have also been made with swivelled clamping elements having their prongs arranged to conform more or less in configuration to certain forms of meat. Here also the same objections apply as the meat to be sliced may be of different configurations, some of which do not conform to any predetermined placement of the tines.

According to the present invention it is proposed to mount the clamping tines in the clamping bar so that they may be displaced to a limited extent on encountering the meat, to permit them to automatically set themselves for any surface configuration. When all the tines encounter the meat being clamped further movement is prevented so that the meat is evenly and firmly clamped in place. This is accomplished by providing a separate resilient mounting for each tine so that it is normally held in substantially mid position of its travel but on the application of pressure may be displaced in either direction from this normal position. The resilient mounting however, is of such nature that it causes the tine to return to mid position as soon as the pressure is removed.

The invention may be more clearly understood from the accompanying drawings in which Fig. 1 shows an elevation of the clamping bar with certain parts broken away to disclose the interior structure.

Fig. 2 shows a plan view of the clamping bar, and

Fig. 3 shows a side elevation thereof.

The device consists of a main clamping bar 10 having holes 11 at its opposite ends adapted to engage guide rods mounted on the movable carriage of a slicing machine. A cross shaft 12 is supported in lugs 13 at the end of the bar and extends through a hollow enlargement 14 positioned substantially midway of the bar. The shaft 12 has small pinions 25 fast to its two ends adapted to mesh with suitable racks on the guide rods. An operating handle 15 extends into the hollow enlargement 14 and coacts through suitable pawl and ratchet mechanism (not shown) with the cross shaft 12. When the handle 15 is in upright position, as shown in the drawing there is no operative connection between the handle and the shaft and the bar 10 in this case is freely movable up and down its guide rods. Such movement causes the shaft 12 to rotate but as the handle is out of operative connection with it this turning has no effect. When the handle is swung counterclockwise from the position shown in Fig. 3 the pawl and ratchet devices engage and the handle in its downward movement positively turns the shaft 12 causing a small differential movement of the bar 10. When the handle reaches its lowermost position the bar 10 is locked, owing to the cooperation of the pawl and ratchet devices, the shaft 12 and the pinions 11, and if the tines 15 engage material to be clamped at this time they hold it firmly in place on the machine carriage. This mechanism is all fully described in the Wood patent, referred to above, and as it forms no part of the present invention will not be further described herein.

The improvement in the present invention resides in the clamping tines or prongs shown at 15 each of which is mounted on a plate 16 freely movable in a space provided between the bar 10 and a cover plate 17, the latter being so shaped as to form a pocket or recess with the side of bar 10. The plates 16 are of the correct width and sufficient in number to comfortably fill the hollow space between the bar 10 and the cover plate 17, and to permit vertical movement of the plates 16 but prevent any appreciable rocking movement. Each plate 16 is provided with a slot 21 into which projects a stud 18 fixed on the bar 10 to center and guide the plate. Compression springs 19 and 20 are provided having one end abutting the stud 18 and the other end abutting an end of the slot 21. This construction yieldably holds the plates 16 in mid position but permits them to move a limited extent when force is applied to the tines 15. The upper ends of the plates 16 are beveled as shown in 21 and the space above them is filled with small metal balls or pellets. If any plate 16 moves upwardly its beveled surfaces cause displacement of the metal pellets which thereupon tend to force the adjacent plates 16 downward. It will be understood then that if a piece of meat being clamped is very irregular in shape the tines 15 which encounter the high portions will be displaced and in moving upward will force the adjacent tines downward causing them quickly to engage the low portions. The result is that the whole clamping structure quickly and accurately conforms to the configuration of the material being clamped and the material is held firmly in place with uniform clamping action over its entire surface.

While I have shown my invention in a single preferred example it will be understood that it is adapted to many cases which will readily occur to those skilled in the art and I intend to limit it only by the scope of the following claims.

What I claim is:

1. A clamping bar comprising a movable supporting structure and a plurality of clamping elements movably supported thereon for individual and independent movements in the line of movement of the supporting structure.

2. A clamping bar comprising a movable supporting structure and a plurality of clamping elements yieldably supported thereon to provided for a variable contour thereof when engaging an article to be clamped.

3. A clamping bar comprising a supporting structure, a plurality of clamping elements movably supported thereon and means responsive to movement of one of said elements for causing movement of others of said elements.

4. A clamping bar comprising a supporting structure, a plurality of clamping elements, means for yieldably attaching said elements to said structure to provide for a variable contour of said elements and means for guiding said elements in a predetermined path.

5. A clamping bar comprising a supporting structure, a plurality of clamping elements movably attached thereto, means for guiding said elements in a predetermined path and resilient means coacting with said elements for returning them to a normal medium position when released.

6. A clamping bar comprising a supporting structure, a plurality of clamping elements movably supported thereon, means for guiding said elements in a predetermined path and means responsive to movement of one of said elements for moving others of said elements in the opposite direction.

7. A clamping bar comprising a supporting structure, a plurality of clamping elements movably attached thereto, means for guiding said elements in a predetermined path, resilient means for restoring said elements to a normal medium position when released and means responsive to movement of any of said elements in one direction for causing movement of other of said elements in the opposite direction.

8. A clamping bar comprising a supporting structure, a plurality of clamping elements each comprising a body portion and a tine, means for movably mounting said elements on said structure said means comprising means for guiding them in a predetermined path and resilient means for normally restoring them to a medium position when released.

9. A clamping bar comprising a supporting structure, a plurality of clamping elements each comprising a body portion and a tine means for movably and yieldably mounting said elements on said structure, said means comprising means for guiding them in a predetermined path and resilient means for normally restoring them to a medium position when released and means responsive to the movement of any of said body portions for displacing others of said body portions in the opposite direction.

10. A clamping bar comprising a supporting structure provided with a recess, a plurality of clamping elements each comprising a body portion and a tine, said body portions being inserted in said recess and co-acting with each other to permit relative longitudinal movement but to prevent rocking movement, means for retaining said body portions in said recess said means including resilient means normally holding said body portions in midposition, and means responsive to movement of any of said body portions in one direction to move others of said body portions in the opposite direction.

11. A clamping bar comprising a supporting structure provided with a recess, a plurality of movable clamping elements each having a body portion extending into said recess to partially fill the same, said body portions serving to close the exterior opening of said recess, and displaceable material filling the remaining portion of said recess.

12. A clamping bar comprising a supporting structure provided with a recess, a plurality of movable clamping elements having a body portion extending into said recess to partially fill the same, said body portions serving to close the exterior opening of said recess, displaceable material filling the remaining portion of said recess, each body portion being provided with a beveled surface to displace said material on inward movement thereof to cause outward movement of other body portions.

13. A clamping element comprising a movable bar and a plurality of clamping elements individually supported thereon to move transversely thereof in the line of movement of the bar to permit them to independently assume a variety of clamping positions.

14. A clamping element comprising a movable bar and a plurality of clamping elements with means for mounting them on the bar to permit movement of the elements independently of the bar in response to a clamping operation.

15. A clamping element comprising a movable bar and a plurality of clamping elements with means for yieldably and individually mounting them on the bar to permit independent movement of each relative to the bar in response to a clamping operation.

In testimony whereof I hereto affix my signature.

JOSEPH HOPKINSON.